US010915692B2

(12) United States Patent
Zhang et al.

(10) Patent No.: US 10,915,692 B2
(45) Date of Patent: Feb. 9, 2021

(54) METHOD FOR SELF-ADAPTIVELY OPTIMIZING PARAMETERS OF A MAIN CIRCUIT IN A BBMC BASED ON A CURRENT RATING

(71) Applicant: HUNAN UNIVERSITY OF SCIENCE AND TECHNOLOGY, Hunan (CN)

(72) Inventors: Xiaoping Zhang, Hunan (CN); Ji Liu, Hunan (CN); Ruirui Zhang, Hunan (CN)

(73) Assignee: Hunan University of Science and Technology, Xingtan (CN)

( * ) Notice: Subject to any disclaimer, the term of this patent is extended or adjusted under 35 U.S.C. 154(b) by 0 days.

(21) Appl. No.: 16/909,825

(22) Filed: Jun. 23, 2020

(65) Prior Publication Data

US 2020/0380196 A1 Dec. 3, 2020

Related U.S. Application Data

(63) Continuation of application No. PCT/CN2019/098334, filed on Jul. 30, 2019.

(30) Foreign Application Priority Data

Dec. 27, 2018 (CN) .......................... 2018 1 1619258

(51) Int. Cl.
*G06F 30/00* (2020.01)
*G06F 30/398* (2020.01)
(Continued)

(52) U.S. Cl.
CPC ............ *G06F 30/398* (2020.01); *G06F 30/20* (2020.01); *G06F 2111/06* (2020.01); *G06F 2111/10* (2020.01)

(58) Field of Classification Search
CPC .... G06F 30/398; G06F 30/20; G06F 2111/06; G06F 2111/10
See application file for complete search history.

(56) References Cited

U.S. PATENT DOCUMENTS 9,793,812 B2 * 10/2017 Friebe .................... H02J 3/381
2012/0191439 A1 * 7/2012 Meagher ................ G06F 30/20
 703/18
2017/0070054 A1 3/2017 Abido et al.

FOREIGN PATENT DOCUMENTS

CN 103683922 A 3/2014
CN 104734532 A 6/2015
(Continued)

OTHER PUBLICATIONS

Huang Yi,Zhang Xiaoping,Wu Lianghong,Optimization of BBMC main circuit parameters based on particle swarm optimization,Journal of Hunan University of Science & Technology( Natural Science Edition).2014,vol. 29 No. 4.

*Primary Examiner* — Naum Levin
(74) *Attorney, Agent, or Firm* — Wayne & Ken, LLC

(57) ABSTRACT

Taking parameters of a main circuit in a BBMC as optimization objects, and a total harmonic distortion of an output voltage of the BBMC, a deviation between an actual output current and a corresponding rated output current as optimization objectives, a mathematical model between optimization objects and optimization objectives is established. A multi-objective optimization satisfaction function and a multi-objective optimization fitness function are established by selecting a current rating as a rated output current of the BBMC. An adaptive wolf pack optimization algorithm is adopted to obtain a set of optimal parameters of the main circuit. The rated output current is changed to obtain n sets of optimal parameters, and functional relationships between the optimal parameters of the main circuit in the BBMC are (Continued)

obtained using a numerical fitting method. Optimal parameters of the main circuit corresponding to different current ratings are determined according to the functional relationships.

6 Claims, 3 Drawing Sheets

(51) Int. Cl.
*G06F 30/20* (2020.01)
*G06F 111/06* (2020.01)
*G06F 111/10* (2020.01)

(56) References Cited

FOREIGN PATENT DOCUMENTS

| | | |
|---|---|---|
| CN | 107070254 A | 8/2017 |
| CN | 107623449 A | 1/2018 |
| CN | 109004830 A | 12/2018 |

\* cited by examiner

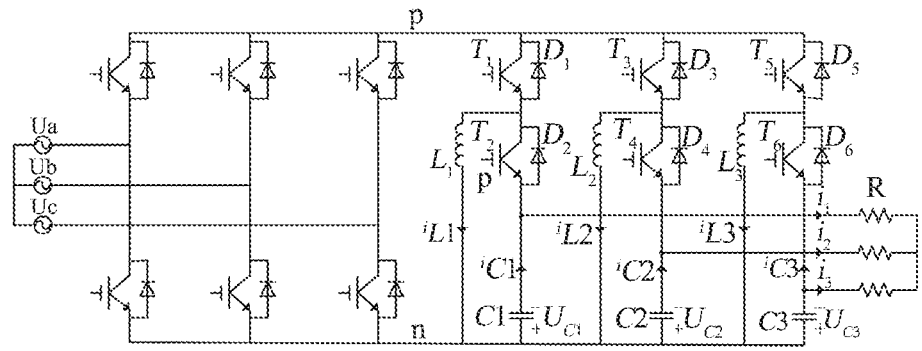

Establish a mathematical model between the optimization objects and the optimization objectives

↓

Establish a multi-objective optimization satisfaction function and a multi-objective optimization fitness function

↓

Iteratively optimize the parameters of the main circuit in the BBMC to obtain a set of optimal parameters of the main circuit in the BBMC

↓

Obtain n sets of optimal parameters of the main circuit in the BBMC

↓

Obtain functional relationships using a numerical fitting method; and determine optimal parameters of the main circuit in the BBMC corresponding to respective current ratings according to the functional relationships

FIG 2

METHOD FOR SELF-ADAPTIVELY OPTIMIZING PARAMETERS OF A MAIN CIRCUIT IN A BBMC BASED ON A CURRENT RATING

CROSS-REFERENCE TO RELATED APPLICATIONS

This application is a continuation of International Application No. PCT/CN2019/098334 with a filling date of Jul. 30, 2019, which claims the benefit of priority from Chinese Application No. 201811619258.4 with a filing date of Dec. 27, 2018. The content of the aforementioned applications, including any intervening amendments thereto, are incorporated herein by reference.

TECHNICAL FIELD

The present application relates to power electronics, and more particularly to a method for self-adaptively optimizing parameters of a main circuit in a BBMC based on a current rating.

BACKGROUND

As a novel power converter, Buck-Boost matrix converter (BBMC) has a high voltage transfer ratio and is capable of directly outputting high-quality sine waves. However, the research shows that inductance and capacitance parameters of the main circuit in the BBMC have a great impact on the magnitude of output current of the BBMC. When the output current changes, the inductance and capacitance parameters need to be optimized accordingly to obtain a minimum harmonic distortion of the output voltage of the BBMC, thereby improving the quality of output voltage waveforms of the BBMC.

Therefore, it is of great significance to determine the optimal parameters of the BBMC according to different rated output currents, and find out the change rules between the optimal parameters of the main circuit of the BBMC and the rated output currents thereof, so as to optimize the main circuit of the BBMC.

SUMMARY

In order to solve the above-mentioned technical problems, the present disclosure provides a method for self-adaptively optimizing parameters of a main circuit in a BBMC based on a current rating.

The technical solutions of the disclosure are described as follows.

The present disclosure provides a method for self-adaptively optimizing parameters of a main circuit in a BBMC based on a current rating, comprising:

(1) taking an inductance parameter L and a capacitance parameter C in bridge arms of the main circuit in the BBMC as optimization objects, a total harmonic distortion THD of an output voltage of the BBMC and a deviation $\Delta i$ between an actual output current of the BBMC and a rated output current of the BBMC as optimization objectives, establishing a mathematical model between the optimization objects and the optimization objective;

(2) selecting a current rating as the rated output current of the BBMC; and establishing a multi-objective optimization satisfaction function and a multi-objective optimization fitness function;

(3) iteratively optimizing parameters of the main circuit in the BBMC using an adaptive wolf pack optimization algorithm to maximize a function value of the multi-objective optimization fitness function, so that an optimal collaboration between the total harmonic distortion THD and the deviation $\Delta i$ is obtained, so as to obtain a set of optimal parameters of the main circuit in the BBMC; changing the magnitude of the rated output current of the BBMC at a certain interval to obtain n sets of optimal parameters of the main circuit in the BBMC; and (4) obtaining functional relationships using a numerical fitting method according to the obtained n sets of optimal parameters and the current ratings corresponding to the n sets of optimal parameters of the main circuit in the BBMC; and determining optimal parameters of the main circuit in the BBMC corresponding to respective current ratings according to the functional relationships.

Compared to the prior art, the disclosure has the following beneficial effects.

The disclosure provides a method for self-adaptively optimizing parameters of a main circuit in a BBMC based on a current rating, in which a mathematical model between optimization objects and optimization objectives is established by taking parameters of the main circuit in the BBMC as the optimization objects, a total harmonic distortion THD of an output voltage of the BBMC, a deviation $\Delta i$ between an actual output current of the BBMC and a rated output current as optimization objectives; a multi-objective optimization satisfaction function and a multi-objective optimization fitness function are established by selecting a current rating as the rated output current of the BBMC. parameters of the main circuit in the BBMC are iteratively optimized using an adaptive wolf pack optimization algorithm to maximize a function value of the multi-objective optimization fitness function, so that an optimal collaboration between the total harmonic distortion THD and the deviation $\Delta i$ is obtained, so as to obtain a set of optimal parameters of the main circuit in the BBMC; and n sets of optimal parameters of the main circuit in the BBMC are obtained by changing the magnitude of the rated output current of the BBMC at a certain interval; functional relationships are obtained using a numerical fitting method according to the obtained n sets of optimal parameters of the main circuit in the BBMC and the corresponding rated currents; and the optimal parameters of the main circuit in the BBMC corresponding to respective current ratings are determined according to the functional relationships. The present disclosure provides a theoretical basis for the optimal design of main circuits of the BBMC with different output current ratings.

BRIEF DESCRIPTION OF THE DRAWINGS

FIG. 1 is a topology diagram showing a main circuit in a BBMC according to the present disclosure.

FIG. 2 is a flowchart of a method for self-adaptively optimizing parameters of the main circuit in the BBMC based on a current rating according to the present disclosure.

DETAILED DESCRIPTION OF EMBODIMENTS

Figure 3:
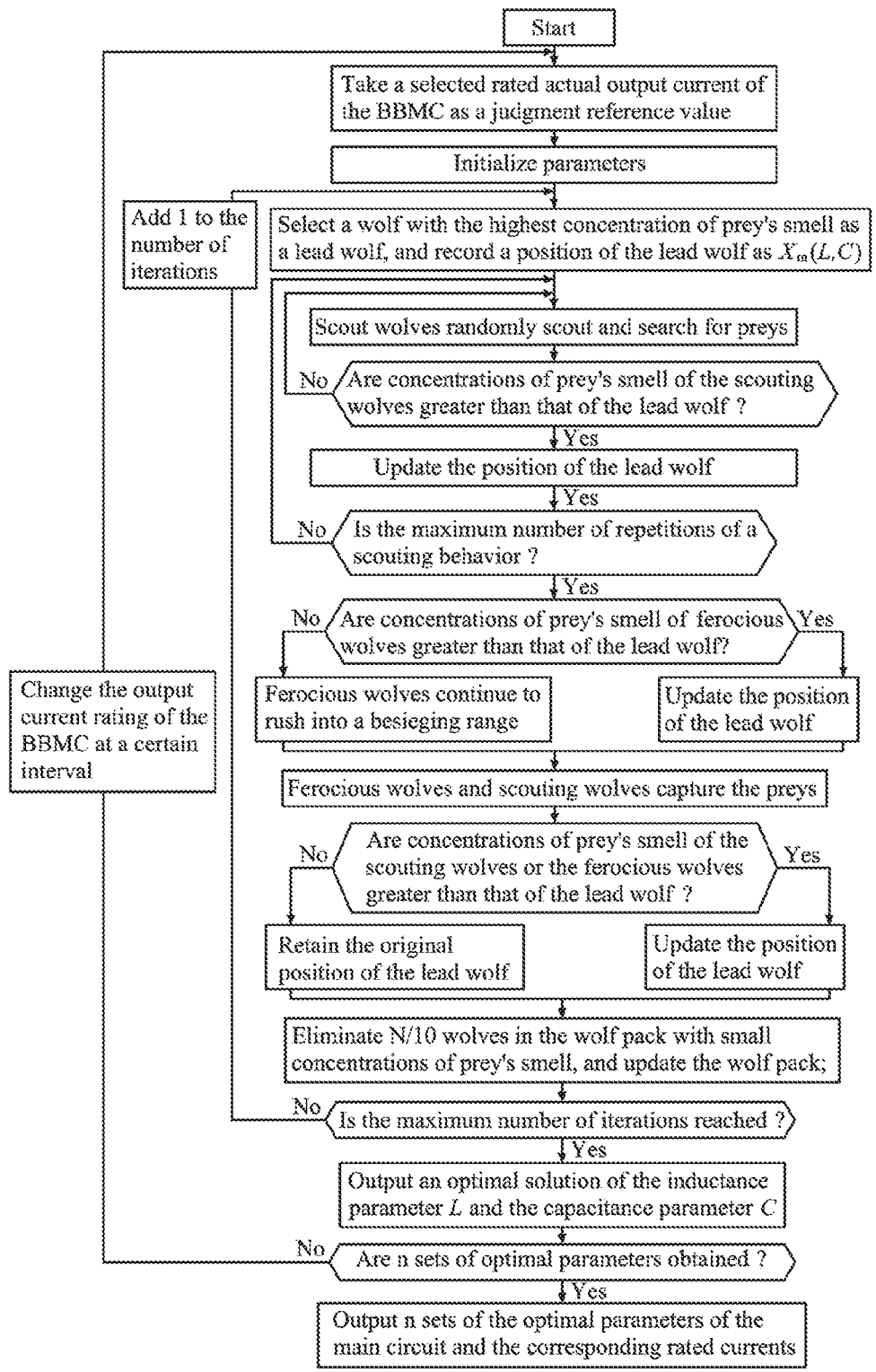
FIG. 3 is a flowchart of an adaptive wolf pack algorithm according to the present disclosure.

The present disclosure will be further described in detail below with reference to the accompanying drawings and embodiments.

As shown in FIG. 1, provided is a main circuit in a BBMC according to the present disclosure. The BBMC includes a rectifier side and an inverter side, where the rectifier side is a three-phase PWM rectifier circuit for rectifying a three-phase AC voltage into a PWM-modulated DC voltage; and the inverter side is a three-phase Buck-Boost inverter, which consists of three Buck-Boost DC/DC converters with the same structure.

As shown in FIG. 2, provides is a flowchart of a method for self-adaptively optimizing parameters of a main circuit in a BBMC based on a current rating according to the present disclosure, including the following steps:

(1) taking an inductance parameter L and a capacitance parameter C in bridge arms of a main circuit as optimization objects, and a total harmonic distortion THD of an output voltage of the BBMC and a deviation $\Delta i$ between an actual output current of the BBMC and a rated output current of the BBMC as optimization objectives, a mathematical model between the optimization objects and the optimization objectives is established; where specific steps are as follows:

(1.1) taking a capacitor voltage $u_C$ and an inductor current $i_L$ of the BBMC as control variables, a state differential equation of the BBMC is established, which is shown as:

$$\begin{cases} \dot{i}_L = \frac{u_C}{L} + \frac{u_C + u_D}{L}d \\ \dot{u}_C = \frac{i_L}{C} - \frac{u_C}{RC} - \frac{i_L}{C}d \end{cases} \quad (1)$$

where $u_D$ is the voltage in a DC side of the BBMC; L and C are respectively the inductance parameter and the capacitance parameter of the BBMC; R is the load resistance of the BBMC; and d is the duty cycle of a power switch tube in the BBMC, where $d \in [0,1]$;

(1.2) since the output voltage u in the BBMC is an AC component of the capacitor voltage $u_C$, an analytical equation of the output voltage u is obtained according to the state differential equation (1):

$$u = e^{\frac{t}{2}\sqrt{\frac{1}{(RC)^2} - \frac{4(1-d)^2}{LC}} + \frac{t}{2RC}} + \frac{U_D d}{1-d}; \quad (2)$$

(1.3) an analytical equation of an output current i is obtained according to the output voltage u and the load resistance R:

$$u = e^{\frac{t}{2}\sqrt{\frac{1}{(RC)^2} - \frac{4(1-d)^2}{LC}} + \frac{t}{2RC}} + \frac{U_D d}{1-d}; \quad (3)$$

(1.4) the total harmonic distortion of the output voltage u is obtained according to a definition of the total harmonic distortion:

$$THD = \sqrt{\frac{\begin{array}{l}(2\exp((T(E_1+4(2d-1-d^2)/E_2)^{(1/2)})/4 + \\ T/(4F_2))(H))/(T(F_1^2+4\omega^2)-(2G+1/F_2)/ \\ (T(H^2+4\omega^2))^2 + (2\exp((T(E_1+4(2d-1-d^2)/ \\ E_2)^{(1/2)})/4+T/(4F_2))(-H))/(T(F_1^2+9\omega^2)) - \\ (2G+1/F_2)/(T(H^2+9\omega^2))^2\end{array}}{\begin{array}{l}2\exp((T(E_1+4(2d-1-d^2)/E_2)^{(1/2)})/4+T/(4F_2)) \\ (-H)/(T(F_1^2+\omega^2))-(2G+1/F_2)/(T(H^2+\omega^2))\end{array}}}; \quad (4)$$

where $E_1 = 1/(RC)^2$, $F_1 = (1-d)^2$, $E_2 = LC$, $F_2 = RC$, $H = \frac{1}{(RC)^2} - \sqrt{\frac{(1-d)^2}{LC}} + \frac{1}{2RC}$, T is the period of the output voltage, and $\omega$ is the angular frequency of the output voltage; and (1.5) the deviation $\Delta i$ between the actual output current of the BBMC and the rated output current of the BBMC is obtained according to the analytical equation of the output current i obtained from the step (1.3):

$$\Delta i = i - I_e = \frac{e^{\frac{t}{2}\sqrt{\frac{1}{(RC)^2} - \frac{4(1-d)^2}{LC}} + \frac{t}{2RC}}}{R} - \frac{U_D d}{(1-d)R} - I_e; \quad (5)$$

(2) a multi-objective optimization satisfaction function and a multi-objective optimization fitness function are established by selecting a current rating as the rated output current of the BBMC, where specific steps are shown as follows:

(2.1) satisfaction functions of optimization objectives THD and $\Delta i$ are respectively established, where
a satisfaction function of THD is shown as:

$$f_1 = \begin{cases} 1 & THD \leq THD' \\ [\ln c_1(THD - THD' + 1) + 1]^{-1} & THD > THD' \end{cases}; \quad (6)$$

a satisfaction function of $\Delta i$ is shown as:

$$f_2 = \begin{cases} 1 & \Delta i \leq \Delta i' \\ [\ln c_2(\Delta i - \Delta i' + 1) + 1]^{-1} & \Delta i > \Delta i' \end{cases}; \quad (7)$$

where THD' and A' are respectively the thresholds of the THD and the $\Delta i$; $c_1$ and $c_2$ are respectively coefficients of satisfaction curves of THD and $\Delta i$, where $c_1 > 0$ and $c_2 > 0$; and (2.2) the multi-objective optimization satisfaction function is established as shown in equation (8):

$$f = k_1 f_1 + k_2 f_2 \quad (8);$$

where $k_1$ and $k_2$ are respectively weight coefficients of the optimization objectives THD and $\Delta i$, and $k_1 + k_2 = 1$; and (2.3) if a satisfaction value $f_j$ of each of the optimization objectives is smaller than a corresponding satisfaction threshold M (j=1, 2), the multi-objective optimization satisfaction function is multiplied by a corresponding penalty factor $b_j$, where a range of the satisfaction threshold M is 0.5~0.8, and a range of the penalty factor $b_j$ is 0.4~0.6; and otherwise, i.e., if the satisfaction value $f_j$ of each of the optimization objectives is greater than or equal to the corresponding satisfaction threshold M (j=1, 2), the penalty factor $b_j$ is set as 1; the multi-objective optimization fitness function $f_s$ is established as shown in equation (9):

$$f_s = k_1 b_1 f_1 + k_2 b_2 f_2 \quad (9);$$

(3) parameters of the main circuit in the BBMC are iteratively optimized using an adaptive wolf pack optimization algorithm to maximize a function value of the multi-objective optimization fitness function, so that an optimal collaboration between the total harmonic distortion THD and the deviation $\Delta i$ is obtained, so as to obtain a set of optimal parameters of the main circuit in the BBMC; FIG. 3 is a flowchart of the adaptive wolf pack optimization algorithm, where specific steps of the adaptive wolf pack optimization algorithm are as follows:

(3.1) the selected rated output current of the BBMC is taken as a judgment reference value of a concentration of prey's smell of the adaptive wolf pack optimization algorithm;

(3.2) the parameters are initialized, where the parameters include: the number N of wolves representing N sets of parameters of the main circuit, position information $X_i(L,C)$, (i=(1,N)) of each wolf, the maximum number $k_{max}$ of iterations, the maximum number $T_{max}$ of repetitions in a scouting behavior, a scale coefficient $\alpha$ of scout wolves, a step length coefficient $\beta$, and the multi-objective optimization fitness function $f_s$ representing the concentration S(i) of prey's smell;

(3.3) a wolf with the highest concentration $S(i)=S_m$ of prey's smell in the wolf pack is selected as a lead wolf, and a position of the lead wolf is recorded as $X_m(L,C)$; in a process of randomly scouting and searching for preys, if the scout wolves find the concentration of prey's smell in a position is greater than that of the lead wolf, the position $X_m(L,C)$ of the lead wolf is updated and the lead wolf summons ferocious wolves at the same time; otherwise, the scout wolves continue to scout until the maximum number $T_{max}$ of repetitions in a scouting behavior is reached, and the lead wolf summons the ferocious wolves in the original position $X_m(L,C)$;

(3.4) when the ferocious wolves (the wolf pack includes the lead wolf, the scouting wolves and the ferocious wolves) rush towards the lead wolf with twice step length of scouting after hearing a summons from the lead wolf; during the rushing, if concentrations of the prey's smell of the ferocious wolves are greater than that of the lead wolf, the position $X_m(L,C)$ of the lead wolf is updated; otherwise, the ferocious wolves continue to rush into a besieging range;

(3.5) the ferocious wolves closer to the lead wolf and the scout wolves capture the prey (prey's smell perceived by the lead wolf is regarded as the prey); if a concentration of the prey's smell of a wolf is greater than that of the lead wolf in the capturing process, the position $X_m(L,C)$ of the lead wolf is updated; otherwise, the original position $X_m(L,C)$ of the lead wolf is retained;

(3.6) N/10 wolves in the wolf pack with smaller concentrations of the prey's smell are eliminated, and the same number of new wolves are randomly generated in a solution space to update the wolf pack;

(3.7) whether the maximum number of iterations is reached is determined; if yes, the position $X_m(L,C)$ of the lead wolf is outputted, i.e., an optimal solution of the parameters L and C of the main circuit is outputted; otherwise, 1 is added to the number of iterations, and the process is returned to the step (3.3);

(3.8) whether n sets of optimal parameters of the main circuit are obtained is determined; if no, the rated output current of the BBMC is changed at a certain interval, and the process is returned to the step (3.1); and (3.9) the n sets of optimal parameters of the main circuit and the corresponding current ratings are outputted;

(4) functional relationships are obtained using a numerical fitting method according to the n sets of optimal parameters of the main circuit in the BBMC and the current ratings corresponding to the n sets of optimal parameters of the main circuit in the BBMC; and optimal parameters of the main circuit in the BBMC corresponding to respective current ratings are determined according to the functional relationships.

Figure 4A:
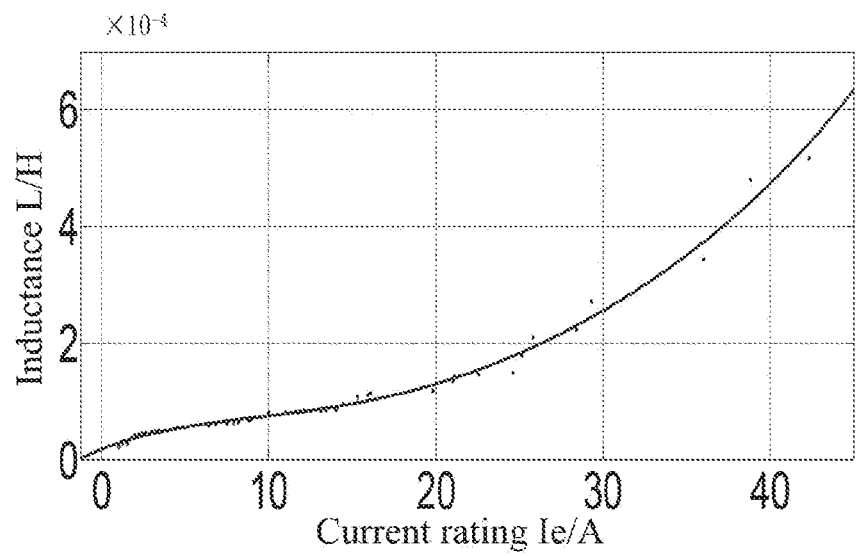
FIG. 4A shows a curve of a fitting function between an optimal inductance parameter of the main circuit in the BBMC and the current rating according to an embodiment of the present disclosure.
Figure 4B:
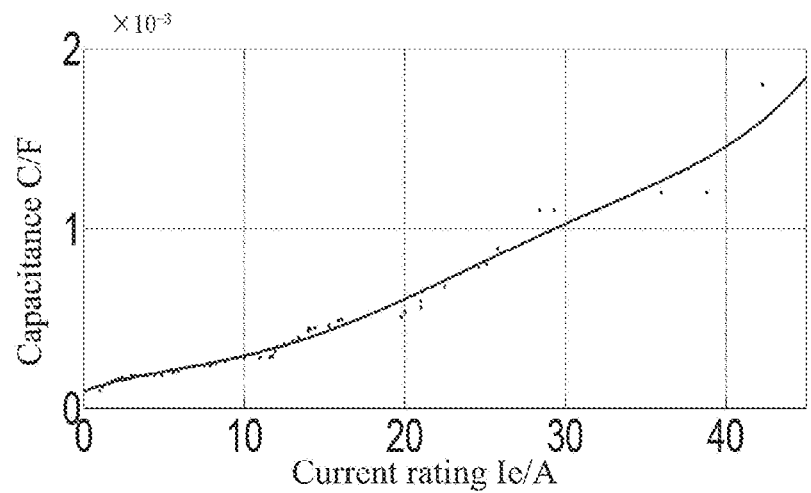
FIG. 4B shows a curve of a fitting function between an optimal capacitance parameter of the main circuit in the BBMC and the current rating according to an embodiment of the present disclosure.

FIG. 4A shows a curve of a fitting function between an optimal inductance parameter of the main circuit in the BBMC and the current rating according to an embodiment of the present disclosure; and FIG. 4B shows a curve of a fitting function between an optimal capacitance parameter of the main circuit in the BBMC and the current rating according to an embodiment of the present disclosure. For example, a range of the rated output current is 0.5~45 A, and 90 current ratings are selected at intervals of 0.5 A in the range of the rated output current; optimal parameters of the main circuit corresponding to each of the current rating data is calculated by adopting the adaptive wolf pack optimization algorithm; a functional relationship is obtained using the numerical fitting method according to the obtained 90 sets of optimal parameters of the main circuit in the BBMC and the corresponding current ratings; in some embodiments, the numerical fitting method is a least square method; the functional relationships include a functional relationship between an optimal inductance parameter L and the current rating $I_e$, and a functional relationship between an optimal capacitance parameter C and the current rating $I_e$; where (4.1) the functional relationship between the optimal inductance parameter L and the current rating $I_e$ is shown in equation (10):

$$f_L(I_e) = a_1 I_e^5 + a_2 I_e^4 + a_3 I_e^3 + a_4 I_e^2 + a_5 I_e + a_6 \quad (10);$$

where $a_1=7.344\times10^{-11}$, $a_2=-7.677\times10^{-9}$, $a_3=2.746\times10^{-7}$, $a_4=-3.369\times10^{-6}$, $a_5=3.284\times10^{-5}$ and $a_6=9.174\times10^{-5}$;

(4.2) the functional relationship between the optimal capacitance parameter C and the current rating $I_e$ is shown in equation (11):

$$f_C(I_e) = b_1 I_e^5 + b_2 I_e^4 + b_3 I_e^3 + b_4 I_e^2 + b_5 I_e + b_6 \quad (11);$$

where $b_1=8.289\times10^{-12}$, $b_2=-1.04\times10^{-9}$, $b_3=5.377\times10^{-8}$, $b_4=-1.02\times10^{-6}$, $b_5=1.148\times10^{-5}$ and $b_6=1.789\times10^{-5}$;

the optimal parameters of the main circuit corresponding to respective current ratings are determined according to the functional relationships between the optimal parameters of the main circuit and the corresponding current ratings.

Described above is only a preferred embodiment of the present disclosure. It should be noted that any improvement and variation made by those skilled in the art without departing from the spirit of the present disclosure shall fall within the scope of the appended claims.

What is claimed is:

1. A method for self-adaptively optimizing parameters of a main circuit in a BBMC based on a current rating, comprising:

(1) taking an inductance parameter L and a capacitance parameter C in bridge arms of the main circuit in the BBMC as optimization objects, a total harmonic distortion THD of an output voltage of the BBMC and a deviation $\Delta i$ between an actual output current of the BBMC and a rated output current of the BBMC as optimization objectives, establishing a mathematical model between the optimization objects and the optimization objectives, comprising:

(1.1) taking a capacitor voltage $u_C$ and an inductor current $i_L$ of the BBMC as control variables, establishing a state differential equation of the BBMC:

$$\begin{cases} \dot{i}_L = \frac{u_C}{L} + \frac{u_C + u_D}{L}d \\ \dot{u}_C = \frac{i_L}{C} - \frac{u_C}{RC} - \frac{i_L}{C}d \end{cases} \quad (1)$$

wherein $u_D$ is the voltage in a DC side of the BBMC; L and C are respectively the inductance parameter and the capacitance parameter of the BBMC; R is the load resistance of the BBMC; and d is the duty cycle of a power switch tube in the BBMC, wherein $d \in [0,1]$;

(1.2) since the output voltage u is an AC component of the capacitor voltage $u_C$, obtaining an analytical equation of the output voltage u according to the state differential equation (1):

$$u = e^{\frac{t}{2}\sqrt{\frac{1}{(RC)^2} - \frac{4(1-d)^2}{LC}} + \frac{t}{2RC}} + \frac{U_D d}{1-d}; \quad (2)$$

wherein $u_D$ is the voltage in a DC side of the BBMC; L and C are respectively the inductance parameter and the capacitance parameter of the BBMC; R is the load resistance of the BBMC; and d is the duty cycle of the power switch tube in the BBMC, wherein $d \in [0,1]$ (1.3) obtaining an analytical equation of an output current i according to the output voltage u and a load resistance R:

$$i = \frac{e^{\frac{t}{2}\sqrt{\frac{1}{(RC)^2} - \frac{4(1-d)^2}{LC}} + \frac{t}{2RC}}}{R} + \frac{U_D d}{(1-d)R}; \quad (3)$$

(1.4) obtaining the total harmonic distortion of the output voltage u according to a definition of the total harmonic distortion:

$$THD = \sqrt{\frac{\begin{array}{l}(2\exp((T(E_1 + 4(2d - 1 - d^2)/E_2)^{(1/2)})/4 + \\ T/(4F_2))(H))/(T(F_1^2 + 4\omega^2) - (2G + 1/F_2)/ \\ (T(H^2 + 4\omega^2))^2 + (2\exp((T(E_1 + 4(2d - 1 - d^2)/ \\ E_2)^{(1/2)})/4 + T/(4F_2))(-H))/(T(F_1^2 + 9\omega^2)) - \\ (2G + 1/F_2)/(T(H^2 + 9\omega^2))^2\end{array}}{\begin{array}{l}2\exp((T(E_1 + 4(2d - 1 - d^2)/E_2)^{(1/2)})/4 + T/(4F_2)) \\ (-H)/(T(F_1^2 + \omega^2)) - (2G + 1/F_2)/(T(H^2 + \omega^2))\end{array}}}; \quad (4)$$

wherein $E_1 = 1/(RC)^2$, $F_1 = (1-d)^2$, $E_2 = LC$, $F_2 = RC$, $H = \frac{1}{(RC)^2} - \sqrt{\frac{(1-d)^2}{LC}} + \frac{1}{2RC}, T$ is the period of the output voltage, and $\omega$ is the angular frequency of the output voltage; and (1.5) obtaining the deviation $\Delta i$ between the actual output current i of the BBMC and the rated output current $I_e$ of the BBMC according to the analytical equation of the output current i in the equation 3:

$$\Delta i = i - I_e = \frac{e^{\frac{t}{2}\sqrt{\frac{1}{(RC)^2} - \frac{4(1-d)^2}{LC}} + \frac{t}{2RC}}}{R} - \frac{U_D d}{(1-d)R} - I_e; \quad (5)$$

(2) selecting a current rating as the rated output current of the BBMC; and establishing a multi-objective optimization satisfaction function and a multi-objective optimization fitness function;

(3) iteratively optimizing parameters of the main circuit in the BBMC using an adaptive wolf pack optimization algorithm to maximize a function value of the multi-objective optimization fitness function, so that an optimal collaboration between the total harmonic distortion THD and the deviation $\Delta i$ is obtained, so as to obtain a set of optimal parameters of the main circuit in the BBMC; changing the magnitude of the rated output current of the BBMC at a certain interval to obtain n sets of optimal parameters of the main circuit in the BBMC; and (4) obtaining functional relationships using a numerical fitting method according to the obtained n sets of optimal parameters and the current ratings corresponding to the n sets of optimal parameters of the main circuit in the BBMC; and determining optimal parameters of the main circuit in the BBMC corresponding to respective current ratings according to the functional relationships.

2. The method of claim 1, wherein establishing a multi-objective optimization satisfaction function in the step 2 comprises:

(a) respectively establishing satisfaction functions of optimization objectives THD and $\Delta i$, wherein a satisfaction function of the THD is shown in equation (6):

$$f_1 = \begin{cases} 1 & THD \leq THD' \\ [\ln c_1(THD - THD' + 1) + 1]^{-1} & THD > THD' \end{cases}; \quad (6)$$

and a satisfaction function of the $\Delta i$ is shown in equation (7):

$$f_2 = \begin{cases} 1 & \Delta i \leq \Delta i' \\ [\ln c_2(\Delta i - \Delta i' + 1) + 1]^{-1} & \Delta i > \Delta i' \end{cases}; \quad (7)$$

wherein THD' and $\Delta i'$ are respectively the thresholds of the optimization objectives THD and $\Delta i$; $c_1$ and $c_2$ are coefficients of satisfaction curves of the optimization objectives THD and $\Delta i$, wherein $c_1>0$ and $c_2>0$; and (b) establishing the multi-objective optimization satisfaction function as shown in equation (8):

$$f=k_1f_1+k_2f_2 \qquad (8);$$

wherein $k_1$ and $k_2$ are respectively weight coefficients of the optimization objectives THD and $\Delta i$, and $k_1+k_2=1$.

3. The method of claim 1, wherein establishing the multi-objective optimization fitness function in the step (2) comprises:

(a) if a satisfaction value $f_j$ of each of the optimization objectives is smaller than the corresponding satisfaction threshold M (j=1, 2), multiplying the satisfaction value by a penalty factor $b_j$; wherein a range of the satisfaction threshold M is 0.5~0.8, and a range of the penalty factor $b_j$ is 0.4~0.6;

otherwise, setting the penalty factor $b_j$ as 1; and (b) establishing the multi-objective optimization fitness function $f_s$ as shown in equation (9):

$$f_s=k_1b_1f_1+k_2b_2f_2 \qquad (9).$$

4. The method of claim 1, wherein iteratively optimizing parameters of the main circuit in the BBMC using an adaptive wolf pack optimization algorithm in the step (3) comprises:

(3.1) taking the selected rated output current of the BBMC as a judgment reference value of a concentration of prey's smell of the adaptive wolf pack optimization algorithm;

(3.2) initializing parameters, wherein the parameters comprise: the number N representing N sets of parameters (L,C) of the main circuit, the maximum number $k_{max}$ of iterations, the maximum number $T_{max}$ of repetitions of a scouting behavior, a scale coefficient $\alpha$ of scout wolves, a step length coefficient $\beta$ and the multi-objective optimization fitness function $f_s$ representing the concentration of prey's smell S(i);

(3.3) selecting a wolf with the highest concentration $S(i)=S_m$ of prey's smell in the wolf pack as a lead wolf, and recording a position $X_m(L,C)$ of the lead wolf; in a process of randomly scouting and searching for preys, if the scout wolves find the concentration of prey's smell in a position is greater than that of the lead wolf, updating the position $X_m(L,C)$ of the lead wolf while the lead wolf summoning ferocious wolves at the same time; otherwise, making the scouting wolves continue to scout until the maximum number $T_{max}$ of repetitions of a scouting behavior is reached, letting the lead wolf summon the ferocious wolves in the original position $X_m(L,C)$;

(3.4) letting the ferocious wolves rush towards the lead wolf with a twice step length of scouting after hearing a summons from the lead wolf, if concentrations of the prey's smell of the ferocious wolves in a rush process are greater than that of the lead wolf, updating the position $X_m(L,C)$ of the lead wolf; otherwise, letting the ferocious wolves continue to rush into a besieging range;

(3.5) letting the ferocious wolves close to the lead wolf and the scout wolves capture a prey; if a concentration of the prey's smell of a wolf in the capturing process is greater than that of the lead wolf, updating the position $X_m(L,C)$ of the lead wolf; otherwise, retaining the original position $X_m(L,C)$ of the lead wolf;

(3.6) eliminating N/10 wolves in the wolf pack with a small concentration of the prey's smell, and randomly generating a same number of new wolves in a solution space to update the wolf pack;

(3.7) determining whether the maximum number of iterations is reached; if yes, outputting the position $X_m(L,C)$ of the lead wolf, that is, outputting an optimal solution of the parameters L and C of the main circuit; otherwise, adding 1 to the number of iterations, and returning to the step (3.3);

(3.8) determining whether n sets of optimal parameters of the main circuit are obtained; if no, changing the rated output current of the BBMC at a certain interval, and returning to the step (3.1); and (3.9) outputting the n sets of optimal parameters of the main circuit and the corresponding current ratings.

5. The method of claim 4, wherein n≥6.

6. The method of claim 1, wherein in the step (4) the numerical fitting method is a least square method; the functional relationships comprise a functional relationship between an optimal inductance parameter L and the current rating $I_e$, and a functional relationship between an optimal capacitance parameter C and the current rating $I_e$;

wherein the functional relationship between the optimal inductance parameter L of the main circuit and the current rating $I_e$ is shown in equation (10):

$$f_L(I_e)=a_1I_e^5+a_2I_e^4+a_3I_e^3+a_4I_e^2+a_5I_e+a_6 \qquad (10);$$

the functional relationship between the optimal capacitance parameter C of the main circuit and the current rating e is shown in equation (11):

$$f_C(I_e)=b_1I_e^5+b_2I_e^4+b_3I_e^3+b_4I_e^2+b_5I_e+b_6 \qquad (11);$$

wherein $f_L(I_e)$ and $f_C(I_e)$ are respectively a function of the optimal inductance parameter of the main circuit and a function of the optimal capacitance parameter of the main circuit; $a_1$, $a_2$, $a_3$, $a_4$, $a_5$ and $a_6$ are respectively coefficients of the function of the optimal inductance parameter; $b_1$, $b_2$, $b_3$, $b_4$, $b_5$ and $b_6$ are respectively coefficients of the function of the optimal capacitance parameter.

* * * * *